United States Patent
Drane (10) Patent No.: US 9,482,095 B2
(45) Date of Patent: Nov. 1, 2016

(54) WEB CONNECTED DUAL AEROFOIL MEMBERS

(71) Applicant: ROLLS-ROYCE PLC, London (GB)

(72) Inventor: Andrew James Drane, St George Bristol (GB)

(73) Assignee: ROLLS-ROYCE plc, London (GB)

( * ) Notice: Subject to any disclaimer, the term of this patent is extended or adjusted under 35 U.S.C. 154(b) by 883 days.

(21) Appl. No.: 13/967,700

(22) Filed: Aug. 15, 2013

(65) Prior Publication Data

US 2014/0271207 A1   Sep. 18, 2014

(30) Foreign Application Priority Data

Sep. 6, 2012 (GB) .................................. 1215908.3

(51) Int. Cl.
*F01D 5/14* (2006.01)
*F04D 29/38* (2006.01)
*F04D 29/02* (2006.01)

(52) U.S. Cl.
CPC ............... *F01D 5/14* (2013.01); *F04D 29/023* (2013.01); *F04D 29/388* (2013.01); *F05D 2230/53* (2013.01); *F05D 2300/603* (2013.01); *Y10T 29/49336* (2015.01)

(58) Field of Classification Search
CPC .................................. F01D 5/14; F04D 29/388
See application file for complete search history.

(56) References Cited

U.S. PATENT DOCUMENTS

| 4,098,559 | A | | 7/1978 | Price | |
|---|---|---|---|---|---|
| 5,573,376 | A | * | 11/1996 | Hayden | F04D 29/321 29/888.025 |
| 5,725,353 | A | | 3/1998 | Matheny et al. | |
| 5,735,673 | A | * | 4/1998 | Matheny | F01D 5/282 416/223 A |
| 6,431,837 | B1 | * | 8/2002 | Velicki | F01D 5/282 416/223 R |
| 7,121,805 | B2 | * | 10/2006 | Chang | F04D 29/34 416/210 R |
| 8,956,487 | B2 | * | 2/2015 | Gallet | B29C 70/86 156/148 |
| 2009/0317246 | A1 | * | 12/2009 | Lutz | F01D 5/14 415/200 |

FOREIGN PATENT DOCUMENTS

FR   2 504 209 A1   10/1982

OTHER PUBLICATIONS

Jan. 4, 2013 Search Report issued in British Patent Application No. GB1215908.3.

* cited by examiner

*Primary Examiner* — Mary A Davis
(74) *Attorney, Agent, or Firm* — Oliff PLC (57) ABSTRACT

A rotor blade assembly for a gas turbine engine includes two aerofoil members joined together at their roots by a blade assembly attachment web. The rotor blade assembly is made from a composite material, for example an organic fiber composite material. The blade assembly attachment web is used to attach a plurality of rotor blade assemblies to the rest of the gas turbine engine in order to form a rotor stage. The rotor stage may, for example, be the fan stage of a turbofan gas turbine engine.

10 Claims, 5 Drawing Sheets

WEB CONNECTED DUAL AEROFOIL MEMBERS

CROSS-REFERENCE TO RELATED APPLICATIONS

This application is based upon and claims the benefit of priority from British Patent Application Number 1215908.3 filed 6 Sep. 2012, the entire contents of which are incorporated by reference.

BACKGROUND OF THE INVENTION

1. Field of the Invention

The present invention relates to a rotor blade assembly for a gas turbine engine. In particular, aspects of the invention relate to a composite rotor blade assembly and arrangements for attaching composite rotor blade assemblies to a gas turbine engine.

2. Description of the Related Art

An axially rotating gas turbine engine comprises a number of rotor stages and a number of stator stages, each comprising aerofoil members mounted around an engine axis. The rotor stages are arranged such that, in use, the aerofoil members rotate around the engine axis. The stator stages are arranged such that, in use, the aerofoil members are fixed in position around the engine axis. Conventionally, a gas turbine engine would have a compressor and a turbine, each of which would comprise at least one (and usually several) rotor and stator stages.

Figure 1:
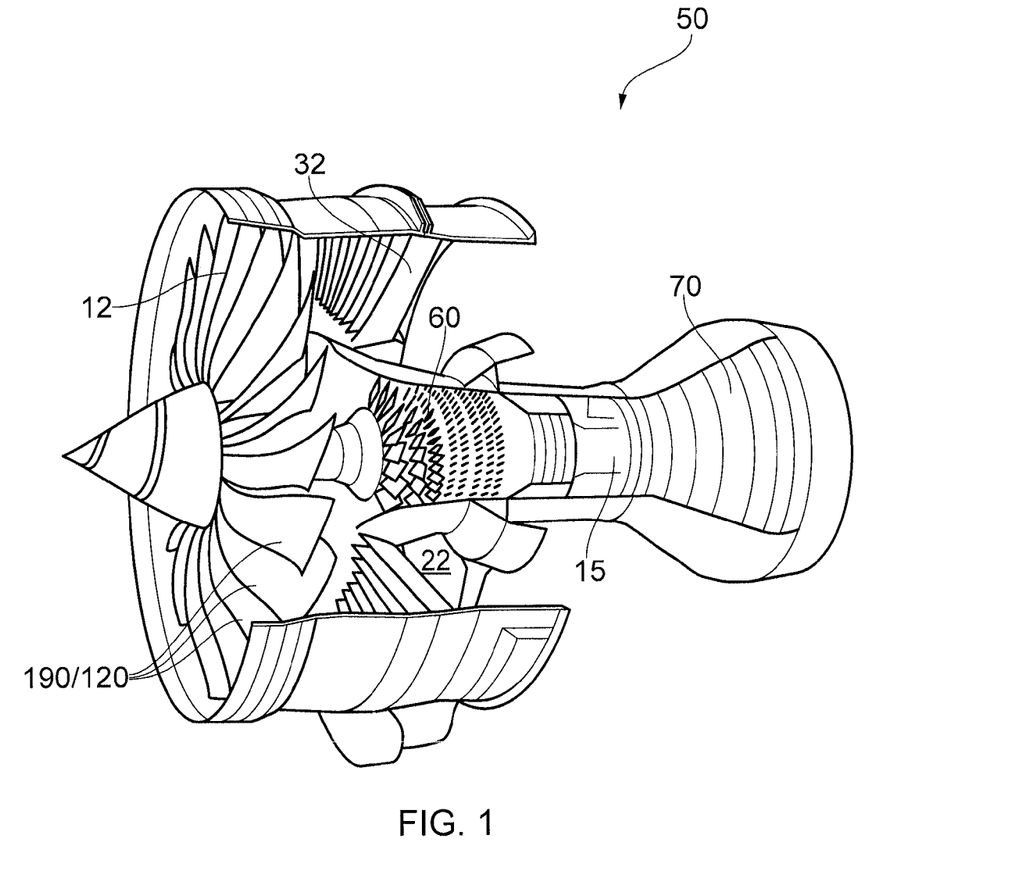
FIG. 1 shows a partially cut-away version of a gas turbine engine.

A cut-away diagram of an example of a turbofan (bypass) gas turbine engine 10 is shown in FIG. 1. The gas turbine engine 10 comprises, in axial flow series, a fan 12, a compressor 60, a combustor 15, and a turbine 70, each of which operates in a conventional manner. The compressor 60 and turbine 70 are conventionally referred to as being part of the core of the engine, and the flow from the fan 12 that does not pass through the core of the engine is said to pass through a bypass duct 22.

The compressor 60 and turbine 70 both have rotor stages and stator stages. The fan 12 may be considered as a rotor stage, and may be referred to as a fan 12 or a fan stage 12. In the FIG. 1 example, a stator stage 32 is provided in the bypass duct 22 for the flow that does not pass through the core of the engine. This stator stage in the bypass duct 22 may be referred to as an outlet (or outer) guide vane (OGV) stage 32.

The fan 12 may be considered as a low pressure compressor. The fan 12 comprises a plurality of fan blades 120/190. In FIG. 1, the fan blades 120/190 may either be conventional fan blades 190 or fan blades 120 in accordance with aspects of the invention. Conventionally, the fan blades 190 are metallic items that are manufactured as single pieces and then assembled onto a rotatable shaft. In order to fix the conventional fan blades 190 onto the rotatable shaft, a wedge shape is generally provided at an inner radius of each blade, which is then slid into position and secured in place during assembly. Such a wedge shaped fitting arrangement may be referred to as a dovetail fixture.

However, metallic fan blades 190 and the conventional arrangements for assembling metallic fan blades 190 to form a fan 12 are very heavy.

It is desirable to replace the conventional metallic fan blades 190 with lighter components. In turn, this would result in a lighter fan stage, and thus a lighter engine, and improved fuel consumption (or SFC).

It is proposed to use a composite structure rather than a metallic structure to form the fan blades. Such a composite structure may have sufficient strength, but considerably lower weight than a conventional metallic fan blades. Composite fan blades may also be less expensive to manufacture than metallic fan blades.

However, conventional approaches to fixing the fan blades to the engine in order to form the fan may not be appropriate when using composite fan blades. For example, a dovetail style fixture may be difficult and/or expensive to form using a composite material whilst retaining the necessary strength and/or longevity of the fixture. Such a dovetail-type fixture may require a rapid build-up of thickness of the composite material in a particular area, making the manufacturing process more complex and potentially introducing weakness at ply drop interfaces.

Although much of the discussion above and elsewhere herein focuses on the fan blades and the fan stage, it will be appreciated that the same or similar considerations may apply to other rotor stages and blades therefor.

OBJECTS AND SUMMARY OF THE INVENTION

It is therefore desirable to use composite blades (for example fan blades), and to be able to attach such composite fan blades to an engine in a suitable manner, for example a manner which is straightforward and/or lightweight and/or retains the material properties (such as strength and/or stiffness) of the composite blades.

According to an aspect there is provided a rotor blade assembly for a gas turbine engine. The rotor blade assembly comprises two aerofoil members extending from a root to a tip. The rotor blade assembly also comprises a blade assembly attachment web extending between the roots of the aerofoil members. The blade assembly attachment web is arranged for use in attaching the rotor blade assembly to the rest of the gas turbine engine in use. The two aerofoil members and the blade assembly attachment web are integrally formed using a fibre-reinforced composite material.

Such an arrangement may allow the use of composite aerofoil members in a rotor is blade stage. The arrangement, including the blade assembly attachment web, may allow the aerofoil members to be attached to the engine (for example to a rotatable shaft) in a manner that retains the strength of the assembly, and is straightforward to manufacture and assemble. Accordingly, this may allow lightweight, strong, and/or robust fan blades to be used, resulting in lower weight and/or less expensive fan blades that may be more straightforward to assemble than conventional fan blades. The arrangement may thus be more appropriate for the use of composite materials than using individual blades with individual, and potentially complex, root fixtures.

As is conventional, the root may be said to be a radially inner portion of the aerofoil member and the tip may be said to be a radially outer portion of the aerofoil member. The root may thus be a root portion. In use, some or all of the root portion may not be exposed to the working fluid. In use, the rest of the aerofoil member, including the tip or tip portion, may be exposed to the working fluid. The aerofoil members may be referred to as blades, for example fan blades.

The blade assembly attachment web may be said to be constructed and/or arranged to allow the rotor blade assembly to be fixed in position in the rotor blade stage in use.

The fibre-reinforced composite material may comprise fibres that extend continuously through the rotor blade assembly. The continuous fibres may extend from the tip of one blade to the tip of the other blade. The continuous fibres may extend from the tip of one blade, through the blade assembly attachment web, to the tip of the other blade. In such an arrangement, the continuous fibres may pass in a substantially radial direction from the tip to the root of one blade, then in a substantially circumferential direction through the blade assembly attachment web, then in a substantially radial direction from the root of the other blade to the tip of that blade. The terms radial and circumferential (and axial) used herein are defined in relation to a rotational axis of a gas turbine engine in which the guide vane assembly is to be fitted/used.

Use of continuous fibres may provide a particularly strong assembly. Furthermore, the strength may be provided in the required direction(s). Thus, for example, aligning fibres radially along the fan blades may provide strength in the radial direction, which may be subject to significant centripetal load during use.

The rotor blade assembly may comprise two and only two aerofoil members.

The fibre reinforced composite material may comprise some fibres that extend in a different direction to other fibres. Thus, not all the fibres may extend in the same direction. This may allow the strength of the assembly to be tailored to the loads that it experiences in use. Purely by way of example, some of the fibres may be arranged at particular angles to other fibres, such as in the range of from 10 degrees to 80 degrees, 20 degrees to 70 degrees, 30 degrees to 60 degrees, for example around 45 degrees.

Each aerofoil member of the rotor blade assembly may have both a pressure surface and a suction surface. Both the pressure surface and suction surface of adjacent aerofoil members in the rotor blade assembly may be formed at least in part using the same set of fibres. The same set of fibres may extend through the whole of both of the aerofoil members in the rotor blade assembly, as well as through the blade assembly attachment web.

The blade assembly attachment web may have a radially inner and a radially outer surface with respect to a rotational axis of the gas turbine engine in use. The radially inner surface may be shaped to cooperate with a mounting surface of the gas turbine engine to allow the rotor blade assembly to be located in position in the gas turbine engine. The radially inner surface may be in direct contact with the mounting surface.

The rotor blade assembly (for example at least a part of the aerofoil members) may comprise a protective coating. The protective coating may, for example, protect the aerofoil member/blade against erosion, which may occur for example due to particle impact during use. The protective coating may be provided over a part or all of the assembly, for example a part or all of the aerofoil members. The coating may comprise, for example a flouroelastomer, polyetheretherketone and/or polyurethane.

At least a part of the outer surface of the assembly may be formed by a glass fibre skin (which may be woven). This may improve the impact toughness of the component. Additionally or alternatively, using a glass fibre skin on the blade assembly attachment web may help to provide galvanic insulation between the web and the component to which it is attached, for example if the web is a carbon composite structure and the component to which it is attached is metallic.

The aerofoil members may comprise a protective layer on the leading edge. Such a protective layer may or may not be in addition to any glass fibre skin provided to the assembly. This may provide additional protection against impact on the leading edge of the aerofoil member, for example due to foreign object strike, such as a bird strike. Such a protective layer may take any suitable form, such as a metallic strip.

The aerofoil members may be aerofoil members of any rotor blade stage. For example, the aerofoil members may be fan blades. The rotor blade assembly may be a fan stage of a turbofan gas turbine engine. Because the fan blades are typically the largest and most complex rotor blades in an engine, the advantages (for example of light weight and simplicity) may be particularly beneficial when the aerofoil members are fan blades for a fan stage.

According to an aspect, there is provided a rotor blade stage of a gas turbine engine comprising at least one (for example a plurality) rotor blade assembly as described above and elsewhere herein. The rotor blade stage also comprises a rotatable hub portion. Each rotor blade assembly may be fixed to the hub portion. The blade assembly attachment web may form at least a part of the fixture of the blade assembly to the hub portion. Accordingly, a lightweight and easy to assemble rotor blade stage (such as a fan stage) may be provided.

The hub portion may be part of, or may be connected to, a rotatable shaft of the gas turbine engine. Such a rotatable shaft (and thus the hub portion) may be driven by a turbine of the gas turbine engine in use, either directly, or indirectly, for example through a gearbox.

In the event of damage to one of the rotor blade assemblies (for example damage to one of the aerofoil members, for example foreign object damage), only the damaged rotor blade assembly need be replaced. The rest of the rotor blade stage may remain untouched. Thus, the costs associated with the repair/overhaul of the stator vane stage may be reduced, and/or the repair/overhaul process may be simplified.

The hub portion may comprise a plurality of mounting surfaces. Each blade assembly attachment web may have a radially inner surface that is shaped to cooperate with a respective mounting surface. Thus, the blade assembly attachment web may be constructed and arranged to cooperate with the hub portion so as to locate each rotor blade assembly on the hub portion.

Each mounting surface may be formed by a radially inner surface (with respect to a rotational axis of the hub/engine) of a respective recess in the hub portion. Thus, the hub portion may have a plurality of recesses, with each rotor blade assembly having a corresponding/respective recess. In this context, the radially inner surface of the recess may point in a radially outward direction, i.e. away from the rotational axis.

The hub portion may be said to have a castellated shape. Such a castellated shape may have recesses and crests. Each recess may be shaped to accept a locating portion of a rotor blade assembly. The locating portion may include at least the blade assembly attachment web. The locating portion may also include a radially extending portion of adjacent aerofoil members.

In such an arrangement, each crest of the hub portion may form a circumferentially extending gas-washed surface (i.e. a surface that extends in a substantially circumferential-axial direction) between aerofoil members.

The rotor blade stage may further comprise a plurality of attachment covers. Each rotor blade assembly may have a corresponding attachment cover. Each blade assembly attachment web may be fixed in position between its respective mounting surface and attachment cover. This may be a particularly accurate, secure and uncomplicated arrangement for attaching the rotor blade assembly to the engine.

Each attachment cover may have a radially inner surface (which in this case may point towards the rotational axis of the engine) and a radially outer surface (which in this case may point away from the rotational axis of the engine). The radially outer surface of the attachment cover may be a gas-washed surface. For example, the radially outer surface may form at least a part of the inner surface of the annular flow passage in which the fan rotates during use. The radially inner surface of each attachment cover may correspond to (for example cooperate with) the radially outer surface of the respective blade assembly attachment web. The attachment cover may be fastened to the hub portion, thus locating/trapping the rotor blade assembly therebetween. Purely by way of example only, the attachment cover may be fastened to the hub portion using one or more fasteners, such as threaded fasteners such as bolts.

According to an aspect, there is provided a gas turbine engine comprising a rotor blade assembly and/or rotor blade stage as described herein. As mentioned elsewhere herein, the rotor blade stage may be a fan stage. The gas turbine engine may thus be a turbofan engine, which may have a bypass duct. Of course, the rotor blade assembly and/or rotor blade stage may be provided to any type of gas turbine engine.

In arrangements in which the rotor blade assembly/stage is provided to a turbofan gas turbine engine, the gas turbine engine may further comprise a nose cone. In such as arrangement, each rotor blade assembly may be clamped between the hub portion and the nose cone. For example, the blade assembly attachment web may be clamped between the hub portion and the nose cone. For example, the blade assembly attachment web may be slid into position in the hub portion (for example into a slot), and the nose cone may then be slid into position (for example axially) in order to retain the rotor blade assembly. The nose cone may have a dedicated protrusion (for example a ring), which may cooperate with the hub portion and the blade assembly attachment web in order to locate/fix the rotor blade assembly in place.

According to an aspect, there is provided a method of assembling a rotor blade stage of a gas turbine engine. The method comprises clamping a plurality of rotor blade assemblies as described by way of example herein between a hub portion of the gas turbine engine and an attachment fixture. The attachment fixture may be either an attachment cover or a nose cone of the gas turbine engine. The attachment cover and/or nosecone may be as described above and elsewhere herein, for example. Thus, for example, the rotor blade stage being assembled may be said to comprise an attachment fixture (which may be either an attachment cover or a nose cone, for example), which has a radially outer surface that, in use, is a gas-washed surface.

BRIEF DESCRIPTION OF THE DRAWINGS

The invention will now be described, by way of example only, with reference to the accompanying Figures, in which.

DETAILED DESCRIPTION OF THE PREFERRED EMBODIMENTS

Figure 2:
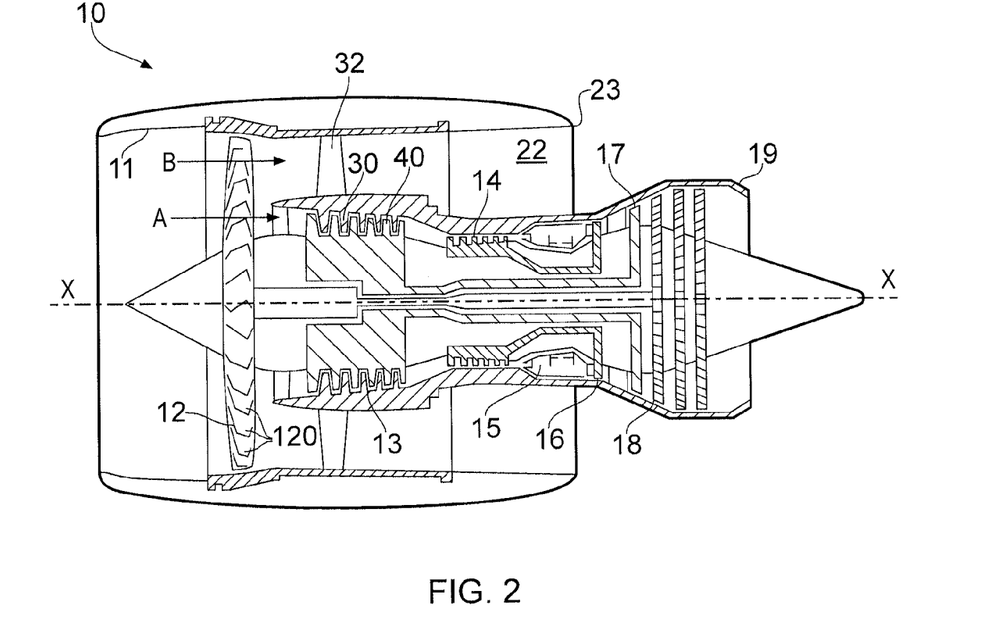
FIG. 2 shows a cross section through a gas turbine engine.

With reference to FIG. 2, a ducted fan gas turbine engine generally indicated at 10 has a principal and rotational axis X-X. The engine 10 comprises, in axial flow series, an air intake 11, a fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive, the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The compressor and turbine each comprise rotor stages and stator stages. In FIG. 2, a stator stage is labelled 30 in the intermediate stage compressor 13 and a rotor stage is labelled 40. The fan 12 may be said to be an example of a rotor stage. The fan 12 may be the most upstream of the rotor stages in an engine.

Figure 3:
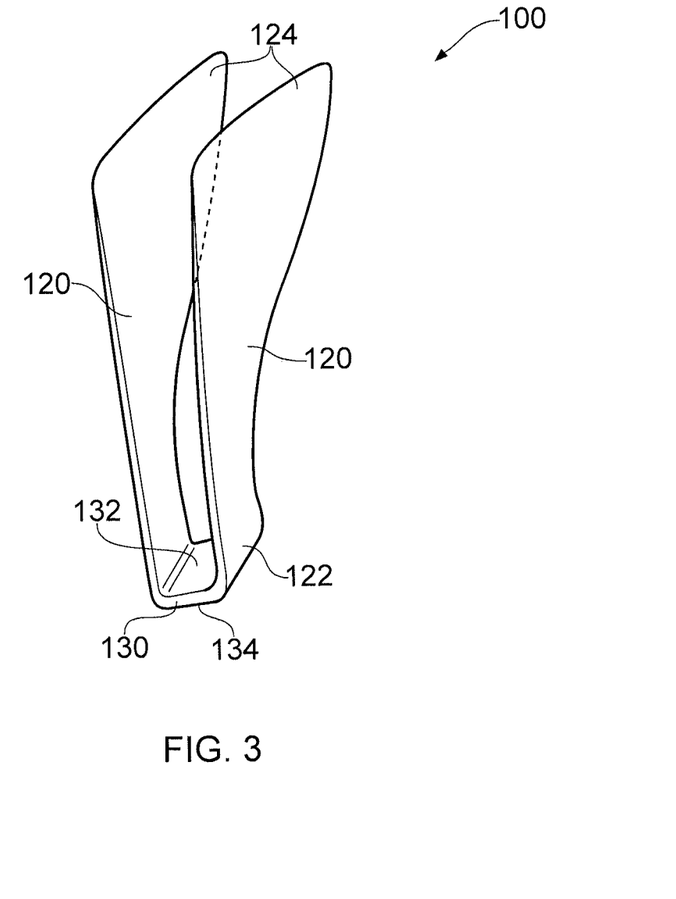
FIG. 3 shows a perspective view of a rotor blade assembly.

The fan 12 comprises a plurality of fan blades 120, as shown in both FIG. 1 and FIG. 2. The fan blades 120 are provided as a pair of fan blades 120 in a fan blade assembly 100. Such a fan blade assembly 100 is shown in greater detail in FIG. 3. The fan blade assembly 120 is an example of a rotor blade assembly 120 that is in accordance with aspects of the invention. The fan blades 120 may be referred to as aerofoil members 120. A plurality of fan blade assemblies 100 may be provided in a gas turbine engine 10 to produce a fan stage 12.

The fan blade assembly 100 comprises blades (or aerofoil members) 120, each extending from a root 122 to a tip 124. The root 122 may be a root portion 122, and the tip 124 may be a tip portion 124. The aerofoil members 120 may be of any shape and/or design. For example, the aerofoil members 120 may be any design of fan blade 120, as shown in the FIG. 3 example. Indeed, the aerofoil members 120 may be any design/shape of rotor blade, for example for a compressor stage 30 or a turbine stage 40 of a gas turbine engine 10. The blades 120 of the rotor blade assembly 100 form adjacent blades 120 of the rotor stage 12 when the rotor stage 12 is assembled.

A blade assembly attachment web 130 extends between the two fan blades 120. The blade assembly attachment web 130 may extend between the roots 122 of the blades 120, as in the example shown in FIG. 3. As explained in greater detail elsewhere herein (for example in relation to FIG. 4, by way of example), the blade assembly attachment web may be used for attaching the fan blade assembly to the gas turbine engine 10, for example to a hub and/or shaft of the gas turbine engine (directly or indirectly).

Rotor blade assemblies according to aspects of the invention, including the rotor blade assembly 100 described herein, may comprise (and/or may be formed or manufactured using) a fibre-reinforced composite material, such as a fibre-resin composite. The fibre-reinforced composite material may be, for example, an organic matrix composite, such as a carbon fibre based composite. Any suitable method may be used to form the fibre-reinforced composite rotor blade assemblies 100 such as, for example, impregnating the fibres with the resin, forming the desired shape and then curing in an autoclave (a so-called "pre-preg" method), or a dry-fibre and resin-transfer method, or an Automated Fibre Placement (AFP) method.

Where the rotor blade assembly 100 is manufactured using a resin transfer method using a dry fibre perform, the outer plies may, for example, be formed from a braided tube slid over the individual plies. This optional feature may provide a continuous outer layer with no ply edges, thereby reducing/substantially eliminating the possibility of delamination. Additionally or alternatively, dry fibre preforms could of have through thickness reinforcement added to the structure in the form of tufting or stitching, z-pinning and/or direct insertion.

The fibres in the rotor blade assembly 100 may be arranged in any manner, as desired. By way of example only, in the rotor blade assembly 100 may comprise at least some fibres that extend from the tip 124 of one of the blades 120 through the assembly 100 to the tip 124 of the other blade 120. Such fibres may extend through the blade assembly attachment web 130. Such fibres may extend from a first tip 124 in a radially inward direction along a first blade 120, then in a substantially circumferential direction through a blade assembly attachment web 130, then in an outwardly radial direction from the root 122 to the tip 124 of the other blade 120. Such fibres may be continuous from the tip 124 of one blade through to the tip 124 of the other blade. Such an arrangement may be particularly strong and/or may allow the shape of the rotor blade assembly 100 to be retained during use. For example, the at least some of the fibres may be arranged so as to be aligned with the main load direction during use (which may be in the radial direction of the engine, for example due to centripetal force during rotation of the blade assembly about the engine axis). Additionally or alternatively, the fibres may be aligned in other directions (such as at 45 degrees or 90 degrees to this direction), for example to provide strength in other directions, and/or chopped fibres may be used.

Optionally, during manufacture, sacrificial material (for example sacrificial layers of fibres) may be provided to allow the component to be machined into a final shape if required. For example, such sacrificial material may be provided to the blade assembly attachment web 130.

At least a part of the rotor blade assembly 100 may comprise a coating, for example a protective coating. For example, the blades/aerofoil members 120 at least may comprise a protective coating, such as an erosion protection coating, which may form (or be applied to) the surface thereof. Such an erosion protection coating may comprise, for example, a fluoroelastomer, a thermoplastic and/or polyurethane.

Additionally or alternatively, the aerofoil members 120 may comprise leading edge protection. Such leading edge protection may take any suitable form, for example metallic strips bonded to the surface of the aerofoils at their leading edge.

The rotor blade assembly 100 may additionally or alternatively comprise a glass fibre skin, which may be woven.

Such coatings and/or skins may not be visible on the surface of the rotor blade assembly and so they are not explicitly labelled in the Figures. However, such coatings/skins may be visible in some arrangements.

Figure 4:
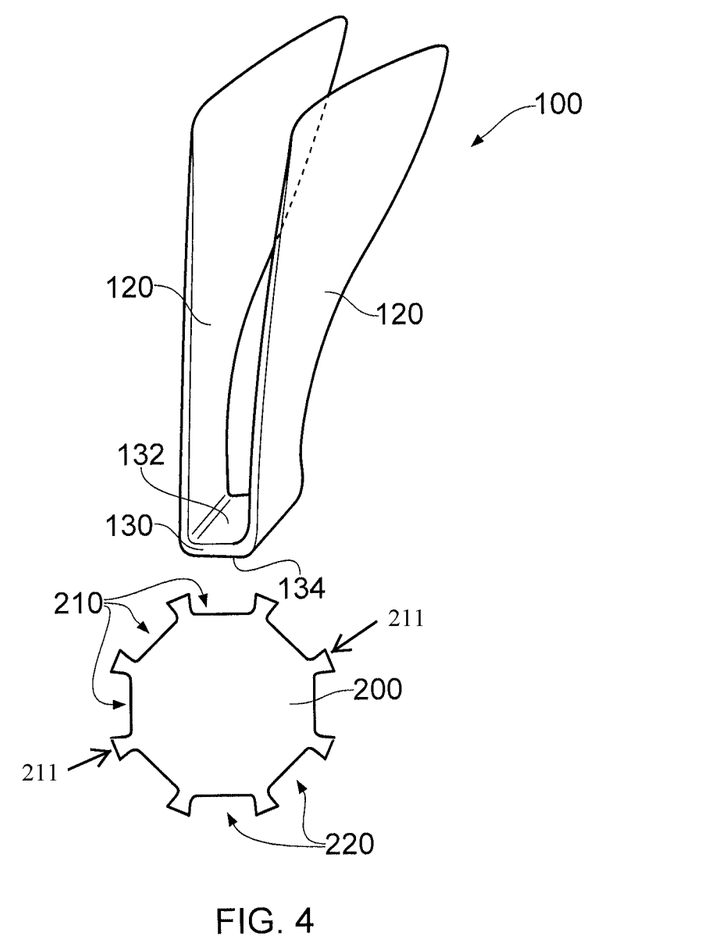
FIG. 4 shows an exploded view of a rotor blade assembly together with a cross-section through a hub portion.
Figure 5:
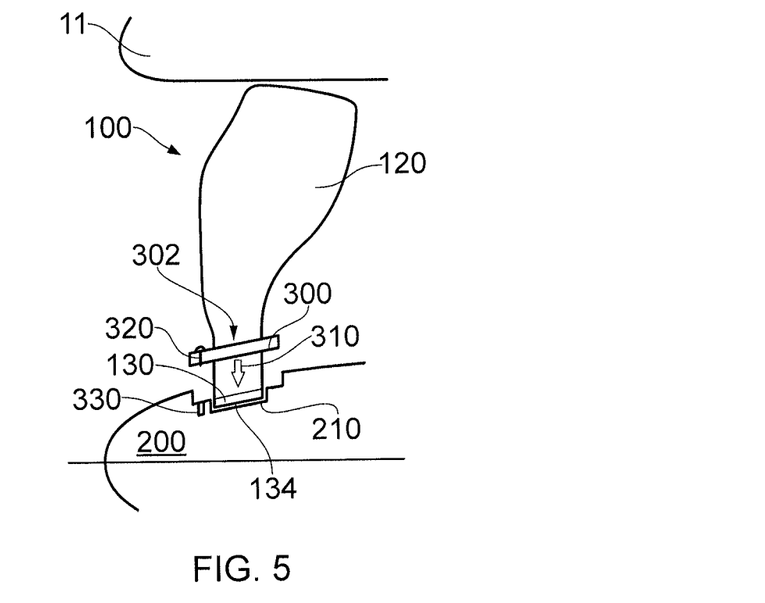
FIG. 5 shows a cross section through a hub portion, a rotor blade assembly, and an attachment panel.
Figure 6:
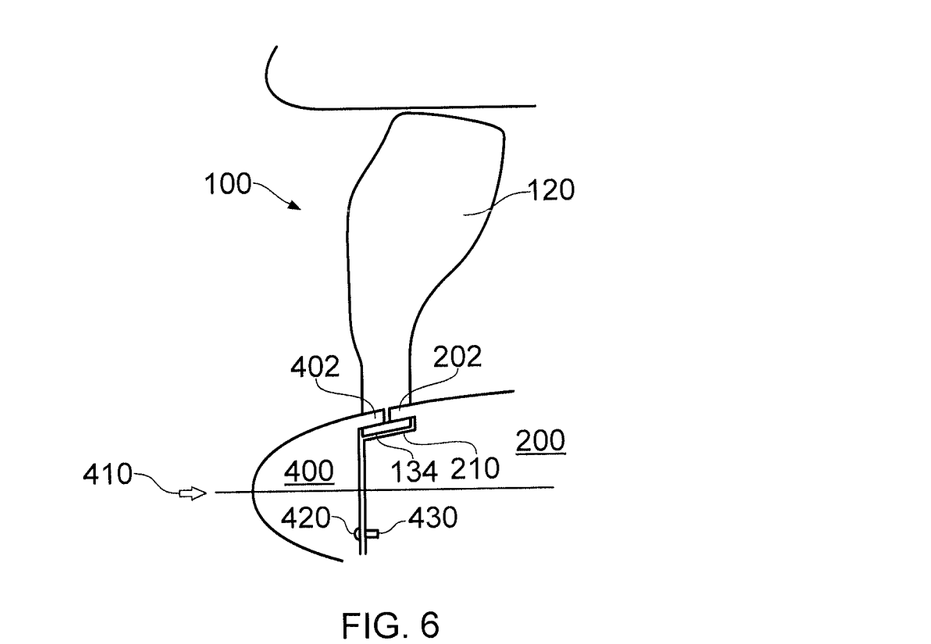
FIG. 6 shows a cross section through a hub portion, a rotor blade assembly, and a nose cone.

The blade assembly attachment web 130 may have a radially outer surface 132 and a radially inner surface 134. The radially outer surface 132 may be referred to as an upper surface, or the surface which points towards the aerofoil members 120. The radially inner surface may be referred to as an inner surface, or the surface that points away from the aerofoil members 120. Referring now to FIGS. 4, 5 and 6, the radially inner surface 134 may be configured (for example shaped) to correspond to (or cooperate with) a mounting surface 210. The rotor blade assembly may be mounted on the mounting surface 210 in order to be attached onto the rest of the gas turbine engine. The mounting surface 210 (or at least a part thereof) may be a part of a rotatable hub 200. The rotatable hub 200 may be a part of, or may be provided on, a rotating shaft. The rotating shaft may be connected to a part of a turbine of the gas turbine engine 10 (for example directly or through a gearbox).

The radially inner surface 134 of the rotor blade attachment web 130 and/or the mounting surface 210 may be, for example, an annular segment or a frusto-conical segment and/or may comprise a location feature for locating the attachment web 130 in position relative to the hub 200.

The hub 200 (which may be referred to as a hub portion 200) may comprise a plurality of mounting surfaces 210, as shown in the FIG. 4 example. The hub portion may thus have a castellated outer surface, with a mounting portion (including the blade assembly attachment web 130) of the rotor blade assembly 100 fixed into the troughs, or recesses, of the castellated surface. In one or more embodiments, the castellated outer surface includes dividing portions 211 on either side of the mounting portion that effectively divide the mounting portions from each other, as well as the rotor blade assembly and respective attachment web from other rotor blade assemblies and their respective attachment webs when the rotor blade assemblies are located onto the hub 200. The dividing portions 211, as shown in FIG. 4, can project in a radially outward direction away from the mounting portions of the hub 200. A rotor blade assembly 100 may be provided to (for example mounted on) each of the mounting surfaces 210 in order to form the fan stage 12. A gas turbine engine 10 may comprise any number of rotor blade assemblies 100 and/or corresponding mounting surfaces 210 in the fan stage 12.

The mounting surface 210 may be formed in any suitable manner. For example, as shown in FIG. 4, the mounting surface 210 could be a radially inner surface (i.e. the surface that faces away from the engine rotational axis X-X) of a recess 220 formed in the hub portion 200.

FIGS. 5 and 6 show two examples of how the rotor blade assembly 100 may be attached to the gas turbine engine 10, via the blade assembly attachment web 130.

In FIG. 5, the blade assembly attachment web 130 is fixed in position using an attachment cover 300. The blade assembly attachment web 130 may be trapped, or fixed, in position between the attachment cover 300 and the mounting surface 210. In the FIG. 5 example, the blade assembly attachment web 130 may be fixed between the attachment cover 300 and the mounting surface 210 by moving the attachment cover 300 in the direction of arrow 310, and then fixing it in position. The attachment cover 300 may be fixed in position using, for example, one or more fasteners 320 (which may be threaded) and one or more corresponding receiving holes 330. The receiving holes 330 may be provided in the hub 200, for example in a recess in the hub for receiving the attachment cover 300. Thus, the rotor blade assembly 100 may be fixed in position without having to modify the blade assembly attachment web 130 (or indeed any part of the assembly 100), thereby not compromising the properties of the rotor blade assembly 100. An outer radial surface 302 of the attachment cover 300 may form a gas washed surface when the gas turbine engine 10 is in use.

FIG. 6 shows an alternative arrangement for attaching the rotor blade assembly 100 in position. Again, the blade assembly attachment web 130 need not itself modified in the FIG. 6 arrangement. In particular, in the FIG. 6 arrangement, the blade assembly attachment web 130 is trapped (or fixed) in position between a hub 200 and a nose cone 400. In the FIG. 6 example, the blade assembly attachment web is fixed between a mounting surface 210 and protrusions 202, 402 provided on the hub 200 and the nose cone 400. As shown in FIG. 6, one or both of the protrusions 202, 402 may have a radially outer surface that, in use, is a gas-washed surface. It will be appreciated that alternative arrangements may be used. Purely by way of example, some arrangement may not require a protrusion 202 on the hub 200, such that the blade assembly attachment web 130 is trapped between the mounting surface 210 and a protrusion on the nose cone 400. In the FIG. 6 example, the nose cone 400 is moved towards the hub 200 in the direction of arrow 410 during assembly, and fastened to the hub 200 using any appropriate fastener 420, 430, such as one or more threaded fasteners 420 and corresponding receiving holes 430.

The attachment cover 300 and the nose cone 400 may be examples of attachment fixtures. Such attachment fixtures may be made from any suitable material, including, for example metal and/or composite, such as fibre (for example organic fibre) and resin composite material, for example fibre reinforced organic matrix material or compression moulding compound.

The arrangements shown in FIGS. 4 to 6 for fixing rotor blade assemblies 100 to the gas turbine engine 10 in order to form a fan stage 12 are examples of those which could be used. It will be appreciated that many other arrangements could be used.

Rotor blade assemblies according to the invention may take many different forms, which are not limited to those described above by way of example in relation to the Figures (and elsewhere herein). For example, a rotor blade assembly may comprise a reinforcement web which may extend between the aerofoil members 120. Such a reinforcement web (not shown in the Figures) may, for example, extend between the rotor blades 120 at any position along their span, i.e. at any radial position, including, for example, at mid-span and at the blade tips. Of course, some examples may not have a reinforcement web at all, such as the examples shown in the Figures.

The rotor blade assembly 100 has been described herein largely in relation to a fan stage 12. However, the rotor blade assembly 100 could be used in any rotor blade stage, for example a rotor blade stage of a compressor or a turbine of a gas turbine engine.

Where reference is made herein to an engine or a gas turbine engine, it will be appreciated that this term may include a gas turbine engine/gas turbine engine installation and optionally any peripheral components to which the gas turbine engine may be connected to or interact with and/or any connections/interfaces with surrounding components, which may include, for example, an airframe and/or components thereof. The gas turbine engine may be any type of gas turbine engine, including, but not limited to, a turbofan (bypass) gas turbine engine, turbojet, turboprop, or open rotor gas turbine engine, and for any application, for example aircraft, industrial, and marine application.

It will be appreciated that many alternative configurations and/or arrangements of rotor blade assemblies 100, rotor blade stages, and attachment arrangements 300, 400 in addition to those explicitly described herein may fall within the scope of the invention. Furthermore, any feature described and/or claimed herein may be combined with any other compatible feature described and/or claimed in relation to the same or another embodiment.

I claim:

1. A rotor blade stage and a rotor blade assembly for a gas turbine engine, wherein the rotor blade assembly comprises:
    two aerofoil members, each extending from a root to a tip; and
    a blade assembly attachment web extending between the roots of the two aerofoil members and arranged for use in attaching the rotor blade assembly to the rest of the gas turbine engine in use, wherein:
    the two aerofoil members and the blade assembly attachment web are integrally formed using a fiber-reinforced composite material; and
    wherein the, rotor blade stage comprises:
        a plurality of the rotor blade assemblies;
        a rotatable hub portion onto which each of the plurality of rotor blade assemblies is fixed using the blade assembly attachment web of each of the plurality of rotor blade assemblies, wherein:
            the rotatable hub portion comprises a plurality of mounting surfaces,
            the plurality of mounting surfaces are separated from each other by dividing portions which project in a radially outward direction from the rotatable hub portion thereby dividing the blade assembly attachment web of each of the plurality of rotor blade assemblies, and
            the blade assembly attachment web of each of the plurality of rotor blade assemblies having a radially inner surface that is shaped to cooperate with a respective one of the plurality of mounting surfaces so as to locate each of the plurality of rotor blade assemblies on the rotatable hub portion.

2. The rotor blade stage and the rotor blade assembly according to claim 1, wherein the blade assembly attachment web has the radially inner surface and a radially outer surface with respect to a rotational axis of the gas turbine engine in use, the radially inner surface being shaped to cooperate with the plurality of mounting surfaces of the gas turbine engine to allow the plurality of rotor blade assemblies to be located in position in the gas turbine engine.

3. The rotor blade stage and the rotor blade assembly according to claim 1, wherein the two aerofoil members are fan blades, wherein the gas turbine engine comprises a turbofan gas turbine engine, and the plurality of rotor blade assemblies are part of a fan stage of the turbofan gas turbine engine.

4. The rotor blade stage and the rotor blade assembly of the gas turbine engine according to claim 1, wherein each mounting surface of the plurality of mounting surfaces is formed by a radially hub outer surface of a respective recess in the rotatable hub portion.

5. The rotor blade stage and the rotor blade assembly according to claim 1, further comprising a plurality of attachment covers, each rotor blade assembly of the plurality of rotor blade assemblies having a corresponding attachment cover, wherein:

each blade assembly attachment web is fixed between its respective mounting surface and attachment cover.

6. The rotor blade stage and the rotor blade assembly according to claim 5, wherein each of the plurality of attachment covers has a radially outer surface which, in use, is a gas-washed surface.

7. The rotor blade stage and the rotor blade assembly according to claim 1, wherein the rotor blade stage is a fan stage of a turbofan gas turbine engine.

8. A gas turbine engine comprising the rotor blade stage and the rotor blade assembly according to claim 1.

9. A method of assembling a rotor blade stage of a gas turbine engine comprising:

integrally forming a rotor blade assembly using fiber-reinforced composite material, wherein the rotor blade assembly comprises:

two aerofoil members, each extending from a root to a tip; and a blade assembly attachment web extending between the roots of the two aerofoil members;

locating a plurality of rotor blade assemblies on a rotatable hub portion by a radially inner surface of the blade assembly attachment web that is shaped to cooperate with a respective one of a plurality of mounting surfaces on the rotatable hub portion, wherein the plurality of mounting surfaces are separated from each other by dividing portions which project in a radially outward direction from the rotatable hub portion thereby dividing the blade assembly attachment web of each of the plurality of rotor blade assemblies; and clamping the blade assembly attachment web of each of the plurality of rotor blade assemblies between the rotatable hub portion and a respective attachment cover.

10. The method of assembling the rotor blade stage of the gas turbine engine according to claim 9, wherein the attachment cover has a radially outer surface which, in use, is a gas-washed surface.

* * * * *